(12) United States Patent
Zheng et al.

(10) Patent No.: US 12,627,935 B2
(45) Date of Patent: May 12, 2026

(54) DEEP LEARNING-BASED METHOD FOR ACOUSTIC FEEDBACK SUPPRESSION IN CLOSED-LOOP SYSTEM

(71) Applicant: INSTITUTE OF ACOUSTICS, CHINESE ACADEMY OF SCIENCES, Beijing (CN)

(72) Inventors: Chengshi Zheng, Beijing (CN); Xiaodong Li, Beijing (CN)

(73) Assignee: INSTITUTE OF ACOUSTICS, CHINESE ACADEMY OF SCIENCES, Beijing (CN)

( * ) Notice: Subject to any disclaimer, the term of this patent is extended or adjusted under 35 U.S.C. 154(b) by 931 days.

(21) Appl. No.: 17/895,655

(22) Filed: Aug. 25, 2022

(65) Prior Publication Data

US 2024/0022864 A1 Jan. 18, 2024

(30) Foreign Application Priority Data

Jul. 14, 2022 (CN) .......................... 202210825168.0

(51) Int. Cl.
*H04R 25/00* (2006.01)
*G06N 3/0442* (2023.01)
(Continued)

(52) U.S. Cl.
CPC ............. *H04R 25/453* (2013.01); *G06N 3/08* (2013.01)

(58) Field of Classification Search
CPC .......... H04R 25/453; H04R 3/02; G06N 3/08; G06N 3/0455; G06N 3/0985; G06N 3/0442; G06N 3/0464
See application file for complete search history.

(56) References Cited

U.S. PATENT DOCUMENTS 4,088,835 A 5/1978 Thurmond et al.
5,187,692 A * 2/1993 Haneda ................... H04S 1/005
367/901
(Continued)

FOREIGN PATENT DOCUMENTS

CN 101320996 A 12/2008
CN 110234051 A 9/2019
(Continued)

OTHER PUBLICATIONS

T. van Waterschoot and M. Moonen, "Fifty Years of Acoustic Feedback Control: State of the Art and Future Challenges," in Proceedings of the IEEE, vol. 99, No. 2, pp. 288-327, Feb. 2011, doi: 10.1109/JPROC.2010.2090998. (Year: 2011).*

*Primary Examiner* — Rehana Perveen
*Assistant Examiner* — Narciso Eduardo Montes
(74) *Attorney, Agent, or Firm* — Oliff PLC

(57) ABSTRACT

A deep learning-based method for acoustic feedback suppression in a closed-loop system, the method includes applying an offline trained closed-loop system suppression model, processing an audio signal input, and then feeding the processed audio signal to a sound reproduction unit of the closed-loop system for playback to achieve acoustic feedback suppression, the closed-loop system suppression model being built based on deep learning; and modeling the closed-loop system, generating a unit impulse response of an acoustic feedback path by simulation, and calculating a maximum stable gain according to each simulated unit impulse response, and generating a closed-loop signal based on the maximum stable gain; generating an open-loop target signal under an open-loop condition by using the audio signal input to the closed-loop system; forming parallel training data of the model by putting the closed-loop signal
(Continued)

and open-loop target signal together, and training the model by using the generated parallel training data.

8 Claims, 3 Drawing Sheets

(51) Int. Cl.
| | |
|---|---|
| *G06N 3/0455* | (2023.01) |
| *G06N 3/0464* | (2023.01) |
| *G06N 3/08* | (2023.01) |
| *G06N 3/0985* | (2023.01) |
| *H04R 3/02* | (2006.01) |

(56) References Cited

U.S. PATENT DOCUMENTS

| | | | | |
|---|---|---|---|---|
| 6,442,280 B1 * | 8/2002 | Ito | ............................ | H04R 3/02 |
| | | | | 381/83 |
| 2006/0227978 A1 | 10/2006 | Truong et al. | | |
| 2011/0019832 A1 * | 1/2011 | Itou | ...................... | H04M 9/082 |
| | | | | 381/66 |
| 2022/0148558 A1 * | 5/2022 | Scheller | ............... | H04R 25/505 |

FOREIGN PATENT DOCUMENTS

| | | | | | |
|---|---|---|---|---|---|
| CN | 111526469 A | | 8/2020 | | |
| CN | 111833896 A | | 10/2020 | | |
| CN | 110234051 B | * | 8/2021 | ............... | H04R 3/12 |
| CN | 113921023 A | | 1/2022 | | |
| CN | 114222225 A | * | 3/2022 | ............. | H04R 27/04 |
| CN | 103475980 A | | 12/2023 | | |
| PT | 2015044915 B | * | 11/2016 | ........... | H04R 25/453 |
| WO | WO-2021198438 A1 | * | 10/2021 | ............. | G06N 3/045 |
| WO | WO-2021207134 A1 | * | 10/2021 | ........... | H04R 25/453 |

* cited by examiner

DEEP LEARNING-BASED METHOD FOR ACOUSTIC FEEDBACK SUPPRESSION IN CLOSED-LOOP SYSTEM

TECHNICAL FIELD

The present invention relates to the field of acoustic feedback suppression of closed-loop systems. The closed-loop systems mentioned in the present invention are a category of systems whose system inputs are influenced by system outputs, including, for example, hearing aid systems and public address systems. The present invention specifically relates to a deep learning-based method for acoustic feedback suppression in a closed-loop system.

BACKGROUND

Sound reinforcement systems are widely used in multimedia electric classrooms, local conference systems and hearing aids as well as artificial cochlea, etc. Such an electro-acoustic system at least includes one microphone, one amplifier and one sound generating unit such as speaker, etc. Acoustic feedback means that when microphone and the speaker are in the same acoustic environment, there exists acoustic coupling due to a small distance therebetween. That is, the microphone picks up an external audio signal, and the audio signal passes through the amplifier and then is played back by the speaker, subsequently passes through a feedback path, is collected by the microphone and amplified by the amplifier again, and then is played back by the speaker again, thereby forming a positive feedback in a continuously cyclic manner. When a frequency meets Nyquist instability conditions, the signal magnitude increases continuously and howling occurs. Too large a signal magnitude can even cause a serious damage to audio equipment. Therefore, suppression of acoustic feedback can not only improve the sound reinforcement performance of the system, but also can ensure the stability and safety of the sound reinforcement system.

SUMMARY OF THE INVENTION

An object of the present invention is to overcome the problem in the prior art that the signal magnitude is too large and can cause a serious damage to audio equipment.

To achieve the above object, the present invention is implemented by the following technical solution.

The present invention proposes a deep learning-based method for acoustic feedback suppression in a closed-loop system, the method including:

applying an offline trained closed-loop system suppression model to the closed-loop system, processing an audio signal input to the closed-loop system, and then feeding the processed audio signal to a sound reproduction unit of the closed-loop system for playback to achieve acoustic feedback suppression, the closed-loop system suppression model being built based on deep learning; and modeling the closed-loop system, generating a unit impulse response of an acoustic feedback path by simulation, and calculating a maximum stable gain according to the unit impulse response, and generating a closed-loop signal based on the maximum stable gain; generating an open-loop target signal under an open-loop condition by using the audio signal input to the closed-loop system; forming parallel training data of the model by putting the closed-loop signal and the open-loop target signal together, and training the model by using the simulated parallel training data.

As one of improvements of the above technical solution, the model is trained in an offline training mode in the method, including the following steps in the training:

step 1: modeling the closed-loop system of acoustic feedback, and generating a unit impulse response of an acoustic feedback path by simulation according to an application scenario;

step 2: establishing a training open-loop system based on deep learning; calculating a maximum stable gain according to the unit impulse response of the acoustic feedback path, determining a forward path gain of the open-loop system based on the maximum stable gain, inputting an audio signal and generating an open-loop signal as target audio for training, and in the closed-loop system, inputting a noisy audio signal and generating a noisy closed-loop signal with feedback, the closed-loop signal and the open-loop signal together constituting parallel training data of the model;

step 3: performing feature extraction of the training data and target mapping of a deep learning neural network;

step 4: designing a deep learning neural network architecture and hyper-parameters; and step 5: selecting an appropriate loss function to train the model to obtain a trained closed-loop system suppression model.

As one of improvements of the above technical solution, the closed-loop system includes a forward path amplification module and a delay module; and the modeling of the closed-loop system of acoustic feedback is expressed as:

$$y(t) = v(t) + u(t) * f(t)$$

where t is sampling time, * is convolution operation, v(t) is an external audio signal, u(t)=y(t)*g(t), with u(t) being a time-domain signal fed to a speaker, g(t) being a unit impulse response of a forward path of the closed-loop system, and y(t) being a pickup signal, and f(t) is the unit impulse response of the acoustic feedback path.

As one of the improvements of the above technical solution, generating a unit impulse response of an acoustic feedback path by simulation comprises:

the delay module performing Fourier transforms on signals in the closed-loop system, which is expressed as:

$$Y(\omega) = V(\omega) + U(\omega)F(\omega)$$

$$U(\omega) = Y(\omega)G(\omega)$$

where ω is an angular frequency, Y(ω) is Fourier transform of y(t), F(ω) is Fourier transform of f(t), V(ω) is Fourier transform of v(t), U(ω) is Fourier transform of u(t), G(ω) is Fourier transform of g(t), and frequency-related gains in the forward path are unified in the feedback channel F(ω).

As one of the improvements of the above technical solution, G(ω) is set to a constant G, an if G is related to the angular frequency, a transfer function in the closed-loop system is:

$$\frac{U(\omega)}{V(\omega)} = \frac{G}{1 - GF(\omega)}$$

according to the Nyquist instability criterion, if a loop gain function meets the following conditions:

$$\begin{cases} \angle GF(\omega) = 2n\pi \\ |GF(\omega)| \geq 1 \end{cases}, n = 0, 1, 2 \ldots$$

where $\angle\bullet$ represents taking a phase, $|\bullet|$ represents taking a modulus; that is, at a position where the angular frequency is $\omega$, if the modulus of the loop gain function is greater than or equal to 1, and a phase angle of the loop gain function is integer n times of $2\pi$, a sound reinforcement system oscillates, resulting in howling, and thus the maximum stable gain $G_{max}$ of the closed-loop system is obtained, which is expressed as:

$$G_{max} = \frac{1}{\max_{\omega\in\Omega}(|F(\omega)|)}$$

$$\Omega = \{\omega|\angle(F(\omega)\exp(-j\omega\tau f_s)) = 2n\pi\}$$

where $\Omega$ is a combination of frequencies that satisfy the phase condition of the Nyquist instability criterion, $\tau$ is delays of all signal processing systems in the sound reinforcement system, $f_s$ is a sampling frequency, and j is an imaginary symbol.

As one of the improvements of the above technical solution, if the closed-loop system further comprises an adaptive feedback cancellation module and a post-processing module, the transfer function in the closed-loop system is expressed as:

$$\frac{U(\omega)}{V(\omega)} = \frac{GH(\omega)}{1 - GH(\omega)(F(\omega) - \hat{F}(\omega))}$$

where $\hat{F}(\omega)$ is Fourier transform of $\hat{f}(t)$, with $\hat{f}(t)$ being a unit impulse response of the feedback path identified by an adaptive method; and $H(\omega)$ is Fourier transform of $h(t)$, with $h(t)$ being a unit impulse response of the post-processing module;

the closed-loop system with adaptive feedback cancellation becomes unstable if a loop gain function satisfies the following conditions:

$$\begin{cases} \angle GH(\omega)(F(\omega) - \hat{F}(\omega)) = 2n\pi \\ |GH(\omega)(F(\omega) - \hat{F}(\omega))| \geq 1 \end{cases}, n = 0, 1, 2 \ldots;$$

and in this case, the maximum stable gain of the closed-loop system is expressed as:

$$G_{max} = \frac{1}{\max_{\omega\in\Omega}(|H(\omega)(F(\omega) - \hat{F}(\omega))|)}$$

$$\Omega = \{\omega|\angle((H(\omega)(F(\omega) - \hat{F}(\omega)))\exp(-j\omega\tau f_s)) = 2n\pi\}.$$

As one of the improvements of the above technical solution, generating a unit impulse response of an acoustic feedback path by simulation includes:

$$f(t) = \sin(2\pi f_{env}t + \varphi_{env})r(t)\exp(-\sigma P(t - t_f))$$

$$P(t - t_f) = \begin{cases} 0, & t < t_f \\ t - t_f, & t \geq t_f \end{cases}$$

where $f_{env}$ is a modulation frequency, $\varphi_{env}$ is a random phase, $r(t)$ is a zero-mean Gaussian process, $\sigma$ is a decay function, where $\sigma \geq 0$, and $t_f$ represents the time when exponential decay of the transfer function starts;

in the closed-loop system, a forward path amplification module is expressed as:

$$g(t) = G\delta(t - \tau f_s)$$

where $\delta(\bullet)$ represents the Dirac function, and G is in the range of $G \in [0.5G_{max}, 0.999G_{max}]$; and a signal $u(t)$ not subject to feedback suppression processing fed to a speaker and a microphone pickup signal $y(t)$ are obtained from $f(t)$, $g(t)$ and $v(t)$.

As one of improvements of the above technical solution, mapping target of the deep learning neural network includes:

mixing $v(t)$ and a noise signal $n(t)$ according to a certain signal-to-noise ratio to obtain a mixed noisy audio input signal $z(t)$:

$$z(t) = v(t) + \alpha n(t)$$

where $\alpha$ is the amount of injected noise calculated according to the signal-to-noise ratio;

using $z(t)$ as an input to the closed-loop system to obtain a noisy signal $u(t)$ with feedback; and using $u(t)$ as an input signal to the neural network, and mapping a target signal $s(t)$, which is expressed as:

$$s(t) = Gv(t - \tau f_s)$$

performing K-point short-time Fourier transforms on $u(t)$ and $s(t)$, respectively, to obtain complex spectra $U(k,l)$ and $S(k,l)$ thereof at a time frame 1 and a frequency band k, the complex spectra being expressed as:

$$S(k, l) = \sum_{\mu=0}^{K-1} s(lR + \mu)w(\mu)e^{-j2\pi k\mu/K},$$

$$U(k, l) = \sum_{\mu=0}^{K-1} u(lR + \mu)w(\mu)e^{-j2\pi k\mu/K}$$

where $w(t)$ is a window function, R is a frame shift, and $\mu$ is a sum variable;

expressing $S(k,l)$ and $U(k,l)$ as the form of a real part and an imaginary part:

$$S(k, l) = S_r(k, l) + iS_i(k, l)$$

-continued $$U(k, l) = U_r(k, l) + iU_i(k, l)$$

where $S_r(k,l)$ and $S_i(k,l)$ are the real part and the imaginary part of $S(k,l)$, respectively, and $U_r(k,l)$ and $U_i(k,l)$ are the real part and the imaginary part of $U(k,l)$, respectively;

using a complex spectral mapping learning method, training the neural network to $\{U_r(k,l), U_i(k,l)\}$ to $\{S_r(k,l), S_i(k,l)\}$, which process is expressed as:

$$\{\tilde{S}_r^c, \tilde{S}_i^c\} = G(U_r^c, U_i^c; \Phi)$$

$$S^c = |S|^{\beta_c} \exp(JL(S))$$

where $G(\bullet,\bullet;\Phi)$ is a mapping function of the deep learning neural network, with $\Phi$ being a network parameter, $(\bullet)^c$ represents a compression operation function, S is an independent variable for the compression operation function, $\beta_c \in [0,1]$, and $\beta_c$ is a compression coefficient; and $$\tilde{S}_r^c$$

and $$\tilde{S}_i^c$$

are real and imaginary parts of a compressed complex spectrum $\tilde{S}^c(k,l)$ of an estimated signal, respectively, and $$U_r^c \text{ and } U_i^c$$

are real and imaginary parts of a compressed complex spectrum of an input feature signal, respectively.

As one of improvements of the above technical solution, a mean squared error between an estimated result and a training target is directly used as the loss function, and the complex spectra and magnitude spectra are limited on the loss function; and a magnitude spectrum and complex spectrum mixed loss function $L^{Mag+RI}$, a magnitude spectrum loss function $L^{Mag}$ and a complex spectrum loss function $L^{RI}$ are respectively expressed as:

$$L^{Mag+RI} = \lambda L^{RI} + (1 - \lambda)L^{Mag},$$

$$L^{Mag} = \left\||\tilde{S}^c| - |S^c|\right\|_F^2,$$

$$L^{RI} = \left\|\tilde{S}_r^c - S_r^c\right\|_F^2 + \left\|\tilde{S}_r^c - S_i^c\right\|_F^2$$

where $\lambda$ is a weight coefficient with a value between 0 and 1, and $\|\ \|_F$ represents a Frobenius norm, abbreviated as F-norm.

As one of improvements of the above technical solution, when the trained model is applied to the closed-loop system, the model outputs a compressed complex spectrum $\tilde{S}^c(k,l)$ of an estimated signal, and $\tilde{S}^c(k,l)$ is decompressed to recover a complex spectrum $\tilde{S}(k,l)$ which is expressed as:

$$\tilde{S}(k, l) = \left|\tilde{S}^c(k, l)\right|^{1/\beta_c} \exp\left(j\mathrm{D}\left(\tilde{S}^c(k, l)\right)\right)$$

where $\beta_c$ is a compression coefficient; j is an imaginary symbol, and D• represents taking a phase; and inverse Fourier transform is performed on the complex spectrum and an overlap-add method is then applied to obtain a time-domain form $\tilde{s}(t)$ of the estimated signal.

Compared with the prior art, the present invention has the following advantages:

In the method, first, closed-loop signals are obtained by simulating a feedback path, and a training dataset is built by using parallel training data for deep learning formed by the closed-loop signals and open-loop signals together; then, a deep learning model is trained by using the built training dataset in an offline training mode; and after the trained model is applied to a closed-loop system, it can effectively suppress feedback signals, improve the quality and intelligibility of speech, and significantly improve the gain of the sound reinforcement system.

Advantage 1: Generating a unit impulse response of an acoustic feedback path by simulation does not need to measure a large number of acoustic feedback paths; this is important in hearing aid applications because measuring a large number of acoustic feedback path unit impulse responses is very difficult and needs a large amount of work, and it is difficult to traverse a variety of complex situation.

Advantage 2: It achieves the first deep learning-based suppression system of a marginally stable system, and can simultaneously solve the marginal howling problem, the comb filtering effect problem and the coloration effect problem, caused by feedback, thereby achieving high-quality audio signal output.

Advantage 3: It achieves denoising and feedback removal simultaneously; by using a closed-loop data generation method and adopting offline model training, it achieves the objective of denoising and feedback removal of an online closed-loop system; compared with a deep denoising method which can only suppress noise but cannot suppress feedback components of an audio signal of a closed-loop system, the present method has obvious advantages.

BRIEF DESCRIPTION OF THE DRAWINGS

FIGS. 7(a)-7(f) shows a diagram of the effect of acoustic feedback suppression of the method of the present invention and diagrams of the effect of other methods, wherein FIG. 7(*a*) is a spectrogram of a target speech signal; FIG. 7(*c*) is a spectrogram of a time-domain signal u(t) after an adaptive feedback cancellation method is applied; FIG. 7(*d*) is a spectrogram of a time-domain signal u(t) after a frequency shift method is applied; FIG. 7(*e*) is a spectrogram of a time-domain signal u(t) after a deep denoising method is applied; and FIG. 7(*f*) is a spectrogram of a time-domain signal u(t) after the method of the present invention is applied.

DETAILED DESCRIPTION

In view of the acoustical feedback phenomenon in a sound reinforcement system, a deep learning-based method for acoustic feedback suppression is proposed in the present invention. First, a training set is constructed in such a manner that a large number of unit impulse responses of an acoustic feedback path are generated first by simulation; using speech and audio signals as an external audio input, a target audio signal is generated under an open-loop condition, an audio signal with feedback is generated under a closed-loop marginally stable condition, and noise is superimposed therewith to generate a noisy audio signal with feedback; next, framing and feature extraction are performed on the noisy audio signal with feedback, learning targets are extracted frame by frame and point by point according to the target audio signal and the noisy audio signal with feedback, a deep neural network model is established, and the network is trained in an offline mode until an error converges to a certain range to complete the model training; finally, in an actual system testing and application stage, framing and feature extraction is performed on the noisy audio signal with feedback in the closed-loop system, and the trained deep neural network model is used to process the same to obtain a time-frequency complex spectrum of the target audio signal, and a time-domain target audio signal is reconstructed finally.

The present invention provides a deep learning-based method for acoustic feedback suppression. Directed to the problem of howling that may be present in hearing aids or live sound reinforcement and other acoustic feedback systems, the method is used to train a deep neural network model in an offline training mode, and the model is then placed in a closed-loop actual system to perform feedback suppression on signals, including specific steps as follows:

step 1: modeling the closed-loop system of acoustic feedback, and generating a unit impulse response of an acoustic feedback path by simulation according to an application scenario;

step 2: calculating a maximum stable gain according to the unit impulse response of the acoustic feedback path, generating an open-loop target audio signal based on the same, and generating an audio signal with feedback in the closed-loop system, injecting noise into the audio signal, and generating a noisy audio signal with feedback in the closed-loop system as well;

step 3: performing feature extraction of data and target mapping of a network;

step 4: designing a deep learning network architecture and hyper-parameters;

step 5: selecting a loss function and training the network; and step 6: adding the trained model to the closed-loop system to suppress acoustic feedback, and reconstructing a time-domain signal.

The technical solution provided in the present invention is further described below in conjunction with embodiments.

Embodiment 1

Figure 1:
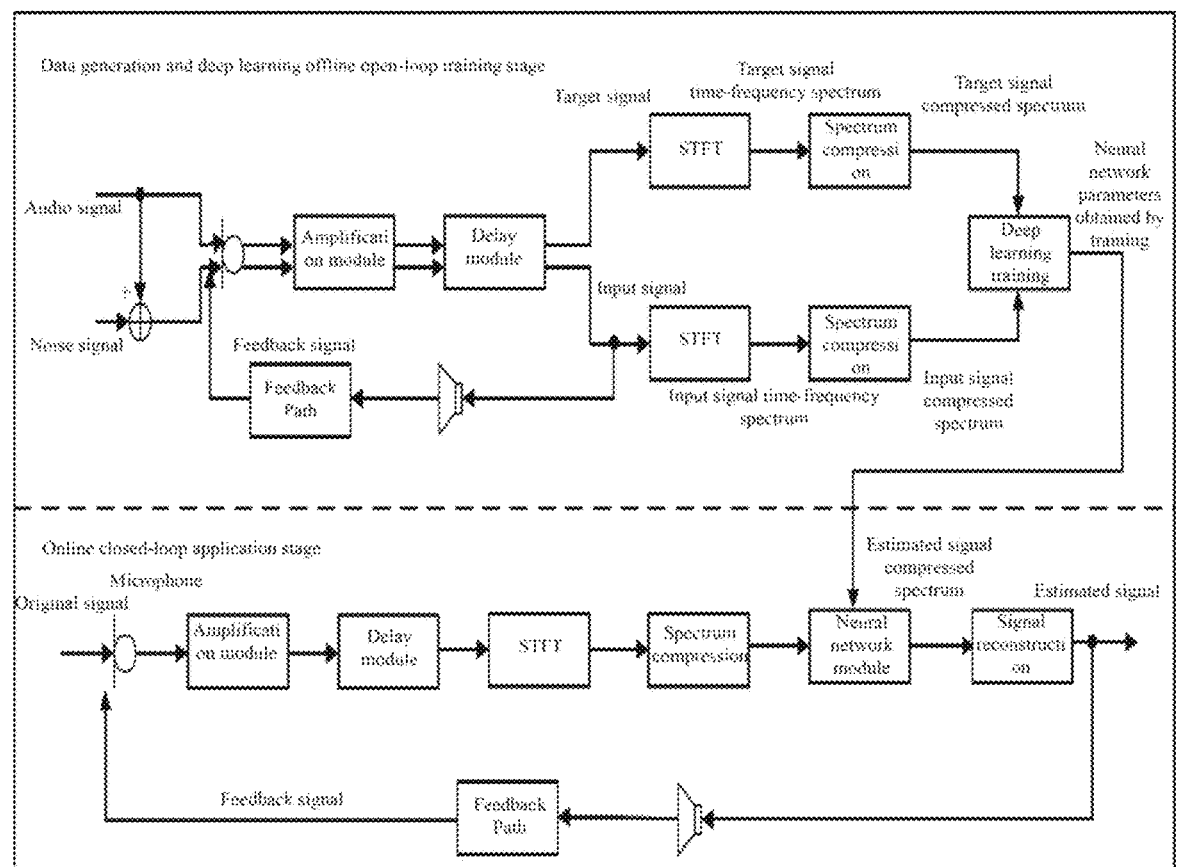
FIG. 1 is an algorithm flow diagram of an embodiment of the present invention.
Figure 2:
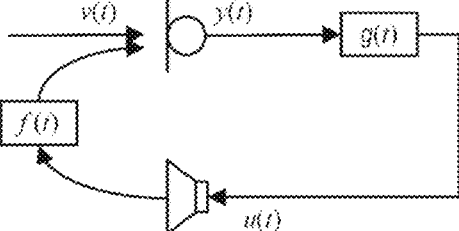
FIG. 2 is a schematic diagram of a closed-loop system.

A flow diagram of a deep learning-based method for acoustic feedback suppression in a closed-loop system in Embodiment 1 of the present invention is shown in FIG. 1. Its implementation is specifically as follows:

Step 1: As shown in FIG. 2, v(t) is an external input signal, which is assumed to be an external audio signal, u(t) is a signal fed to a speaker, y(t) is a microphone pickup signal, and f(t) is a unit impulse response of an acoustic feedback path. Thus, we obtain:

$$y(t) = v(t) + u(t) * f(t) \tag{1}$$

where t is sampling time, and * is convolution operation. By performing Fourier transforms on the time-domain signals, we obtain:

$$Y(\omega) = V(\omega) + U(\omega)F(\omega) \tag{2}$$

$$U(\omega) = Y(\omega)G(\omega)$$

where $\omega$ is an angular frequency. Without loss of generality, we assume that a forward path gain is a fullband gain, i.e. $G(\omega)=G$ is a constant; and if $G(\omega)=G$ is frequency-related, a frequency-related part can be incorporated into a frequency response of the acoustic feedback path. Thus, we can obtain a speaker to microphone closed-loop transfer function:

$$\frac{U(\omega)}{V(\omega)} = \frac{G}{1 - GF(\omega)} \tag{3}$$

Figure 3:
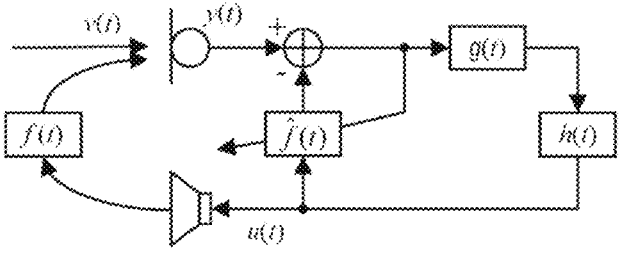
FIG. 3 is a schematic diagram of the closed-loop system added with an adaptive filter module and a post-processing module.

According to the Nyquist instability criterion, if a loop gain meets the following conditions:

$$\begin{cases} \angle GF(\omega) = 2n\pi \\ |GF(\omega)| \geq 1 \end{cases}, n = 0, 1, 2 \ldots \tag{4}$$

where $\angle \bullet$ represents taking a phase, and $|\bullet|$ represents taking a modulus; that is, at a position of the angular frequency $\omega$, if the modulus of the loop gain function is greater than or equal to 1, and a phase angle of the loop gain function is integer times of $2\pi$, a sound reinforcement system oscillates at the frequency, resulting in howling. Thus, a marginally stable gain of the closed-loop system is obtained:

$$G_{max} = \frac{1}{\max_{\omega \in \Omega}(|F(\omega)|)} \tag{5}$$

$$\Omega = \{\omega \mid \angle(F(\omega)\exp(-j\omega\tau f_s)) = 2n\pi\}$$

where $\tau$ is delays of all signal processing systems in the sound reinforcement system in second (s), $f_s$ is a sampling frequency in Hertz (Hz).

if an adaptive filter module $\hat{f}(t)$ and a post-processing module h(t) (such as a phase modulation module and a gain control module) are present in the system, as shown in FIG. 3, equations (3)-(5) are modified as follows:

$$\frac{U(\omega)}{V(\omega)} = \frac{GH(\omega)}{1 - GH(\omega)(F(\omega) - \hat{F}(\omega))} \tag{6}$$

$$\begin{cases} \angle GH(\omega)(F(\omega) - \hat{F}(\omega)) = 2n\pi \\ |GH(\omega)(F(\omega) - \hat{F}(\omega))| \geq 1 \end{cases}, \ n = 0, 1, 2 \ldots \tag{7}$$

$$G_{max} = \frac{1}{\max_{\omega \in \Omega}(|H(\omega)(F(\omega) - \hat{F}(\omega))|)} $$

$$\Omega = \{\omega \mid \angle((H(\omega)(F(\omega) - \hat{F}(\omega)))\exp(-j\omega\tau f_s)) = 2n\pi\} \tag{8}$$

Step 2: Using hearing aids as an example, few measured acoustic feedback paths are publicly available, while a deep learning model needs a large amount of data for training. To generate a large number of acoustic feedback paths, a generation-by-simulation method is proposed here, which is:

$$f(t) = \sin(2\pi f_{env}t + \varphi_{env})r(t)\exp(-\sigma P(t - t_f)) \tag{9}$$

$$P(t - t_f) = \begin{cases} 0, & t < t_f \\ t - t_f, & t \geq t_f \end{cases}$$

where $f_{env}$ is a modulation frequency, $\varphi_{env}$ is a random phase, r(t) is a zero-mean Gaussian process, $\sigma \geq 0$ is a decay function, and $t_f$ is introduced, which represents the time when exponential decay of the transfer function starts.

In the closed-loop system, a forward path amplification module is expressed as:

$$g(t) = G\delta(t - \tau f_s) \tag{10}$$

where $\delta$ represents a Dirac function. In this method, to ensure that the constructed data is not infinite and not all audio signals without feedback, the value of G is in the range of $G \in [0.5G_{max}, 0.999G_{max}]$.

A signal u(t) not subject to feedback suppression processing fed to the speaker and a microphone pickup signal y(t) can be obtained from the equations (9) and (10) and a target signal source v(t).

Step 3: The audio signal v(t) and a noise signal n(t) are mixed according to a certain signal-to-noise ratio:

$$z(t) = v(t) + \alpha n(t) \tag{11}$$

where $\alpha$ is the amount of injected noise calculated according to the signal-to-noise ratio. The signal z(t) obtained is used as an input to the closed-loop system to obtain a noisy signal u(t) with feedback; and this signal is used as an input signal to the neural network, and a target signal is mapped, which is expressed as:

$$s(t) = Gv(t - \tau f_s) \tag{12}$$

K-point short-time Fourier transforms are performed on u(t) and s(t), respectively, to obtain complex spectrum expressions thereof at a time frame l and a frequency band k:

$$S(k, l) = \sum_{\mu=0}^{K-1} s(lR + \mu)w(\mu)e^{-j2\pi k\mu/K}, \tag{13}$$

$$U(k, l) = \sum_{\mu=0}^{K-1} u(lR + \mu)w(\mu)e^{-j2\pi k\mu/K}$$

where w(t) is a window function, and R is a frame shift. Equation (13) is expressed as the form of a real part and an imaginary part:

$$S(k, l) = S_r(k, l) + iS_i(k, l) \tag{14}$$

$$U(k, l) = U_r(k, l) + iU_i(k, l)$$

where $S_r(k,l)$ and are the real part and the imaginary part of S(k,l), respectively, and $U_r(k,l)$ and $U_i(k,l)$ are the real part and the imaginary part of U(k,l), respectively.

In this method, we use a complex spectral mapping learning method, i.e., training the neural network to learn mapping from $\{U_r(k,l),U_i(k,l)\}$ to $\{S_r(k,l),S_i(k,l)\}$. This process can be expressed as:

$$\{\tilde{S}_r^c, \tilde{S}_i^c\} = G(U_r^c, U_i^c; \Phi) \tag{15}$$

$$S^c = |S|^{\beta_c}\exp(jL(S))$$

where $G(\bullet, \bullet; \Phi)$ is a mapping function of the neural network, with $\Phi$ being a network parameter; $(\bullet)^c$ represents compression operation on a spectrum, and $\beta_c \in [0,1]$ is a compression coefficient;

$$\tilde{S}_r^c$$

and $$\tilde{S}_i^c$$

are real and imaginary parts of a compressed complex spectrum of an estimated signal, respectively, and $$U_r^c \text{ and } U_i^c$$

are real and imaginary parts of a compressed complex spectrum of an input feature signal, respectively.

Figure 4:
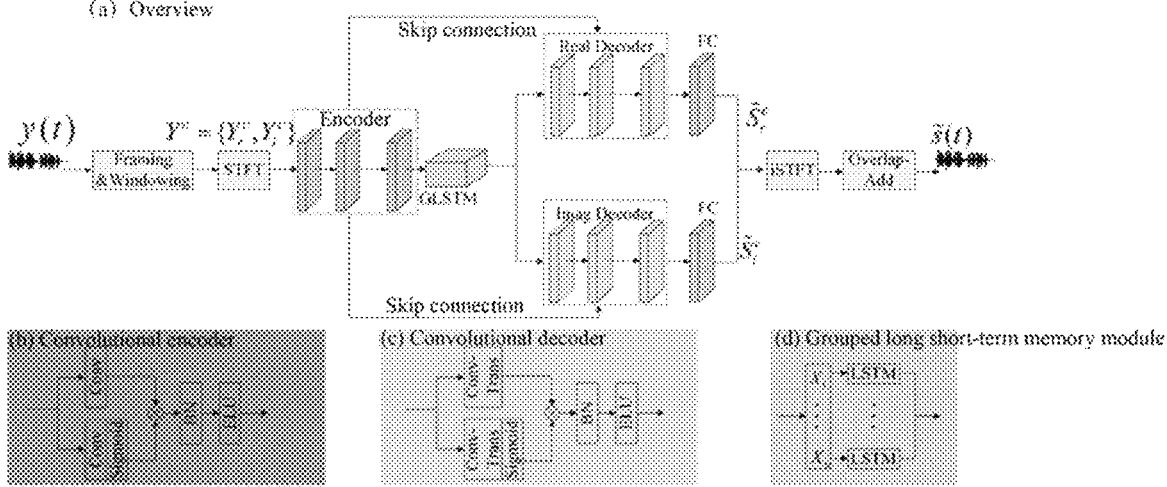
FIG. 4 is a structure diagram of a deep network model in an embodiment of the present invention, using GCCRN as an example.

Step 4: Design of deep neural network architecture. This step can use a network architecture such as a convolutional recurrent neural network (RNN) and their variants (LSTM, GRU, etc.) as well as a convolutional recurrent network (CRN). This method uses a GCCRN network, which consists of three parts, namely a convolutional encoder (Encoder block), a grouped long short-term memory (GLSTM) module and two convolutional decoders (Decoder block), as shown in FIG. 4. The encoder includes a total of 5 convolution modules, each of which includes a two-dimensional convolutional layer (Conv), a batch normalization layer (BN), and an exponential linear activation (ELU) unit. At the decoder side, the present invention uses a convolution module similar to the encoding part. The decoding part includes two decoders, each of which includes 5 deconvolution blocks, each convolution block including a deconvolutional layer (Conv-Trans), a batch normalization layer, and an exponential linear activation unit. To compensate for information loss in the encoding part due to feature dimension compression, the present invention introduces skip connection, which is used to stack, in the channel dimension, features of the decoding block with those of the corresponding encoding end, and feed them to the next deconvolution block. In a feedback system, there is a causal relationship between signals of preceding and following frames. To ensure proper operation of the system, we use causal convolution to ensure that the computation of the current frame is only related to the computation of previous frames and does not involve information of future frames. In the case where $f_s$=16000 Hz and K=320 specific network parameter settings and dimensional changes are shown in Table 1. Table 1 shows the specific network parameter settings and dimensional changes.

TABLE 1

| Network layer | Input dimension | Hyper-parameter | Output dimension |
|---|---|---|---|
| Conv2D_1 | 2 × T × 161 | 1 × 3, (1, 2), 16 | 16 × T × 80 |
| Conv2D_2 | 16 × T × 80 | 1 × 3, (1, 2), 32 | 32 × T × 39 |
| Conv2D_3 | 32 × T × 39 | 1 × 3, (1, 2), 64 | 64 × T × 19 |
| Conv2D_4 | 64 × T × 19 | 1 × 3, (1, 2), 128 | 128 × T × 9 |
| Conv2D_5 | 128 × T × 9 | 1 × 3, (1, 2), 256 | 256 × T × 4 |
| Reshape_1 | 256 × T × 4 | — | T × 1024 |
| LSTM_1 | T × 1024 | 1024 | T × 1024 |
| LSTM_2 | T × 1024 | 1024 | T × 1024 |
| Reshape_2 | T × 1024 | — | 256 × T × 4 |
| Skip_connection_1 | 256 × T × 4 | — | 512 × T × 4 |
| Deonv2D_1 | 512 × T × 4 | 1 × 3, (1, 2), 128 | 128 × T × 9 |
| Skip_connection_2 | 128 × T × 9 | — | 256 × T × 9 |
| Deonv2D_2 | 256 × T × 9 | 1 × 3, (1, 2), 64 | 64 × T × 19 |
| Skip_connection_3 | 64 × T × 19 | — | 128 × T × 19 |
| Deonv2D_3 | 128 × T × 19 | 1 × 3, (1, 2), 32 | 32 × T × 39 |
| Skip_connection_4 | 32 × T × 39 | — | 64 × T × 39 |
| Deonv2D_4 | 64 × T × 39 | 1 × 3, (1, 2), 16 | 16 × T × 80 |
| Skip_connection_5 | 16 × T × 80 | — | 32 × T × 80 |
| Deonv2D_5 | 32 × T × 80 | 1 × 3, (1, 2), 1 | 1 × T × 161 |
| Linear(×2) | 1 × T × 161 | 161 | 1 × T × 161 |
| Concat | 1 × T × 161 (×2) | — | 2 × T × 161 |

Parameters of the convolutional layers are expressed in the form of convolutional kernel, number of channels, and skip value, and their input and output dimensions are expressed in the form of number of channels, time dimension, and feature dimension. In addition, the training batch of the network is set to 16, the number of iterations is set to 30, network training is optimized by using an Adam optimizer with a learning rate of $1.0×10^{-3}$ and a decay rate of s$1.0×10^{-7}$, and then training is started. The deep neural network here can be in the form of other networks, such as a deep neural network based on magnitude mapping, a deep neural network based on real or complex mask mapping; the goal can also be achieved by using a shallow neural network, which is still a simple extension of the present invention.

Using the parallel data construction method proposed in the present invention, as well as the offline training and online application mode, even with a time-domain deep neural network model, is also a simple extension of the present invention. This implementation uses a network model established based on deep learning. In fact, it is also possible to be based on other machine learning methods, and using other machine learning methods is also protected by the present invention.

Step 5: A mean squared error (MSE) between an estimated result and a training target can be directly used as a loss function. Research shows that limiting both the complex spectra and magnitude spectra on the loss function can effectively improve the quality of speech or audio, i.e.

$$L^{Mag+RI} = \lambda L^{RI} + (1 - \lambda)L^{Mag}, \tag{16}$$

$$L^{Mag} = \left\| |\tilde{S}^c| - |S^c| \right\|_F^2,$$

$$L^{RI} = \left\| \tilde{S}_r^c - S_r^c \right\|_F^2 + \left\| \tilde{S}_r^c - S_i^c \right\|_F^2$$

where $\lambda$ is a weight coefficient with a value between 0 and 1, generally of 0.5. $\lambda$ should approach 0 in low signal-to-noise ratio scenarios, and $\lambda$ should approach 1.0 in high signal-to-noise ratio scenarios. If the magnitude spectra are used for mapping in the network, the value of $\lambda$ is 0. Using other loss functions, such as SI-SDR, is still a simple extension of the present invention.

Figure 5:
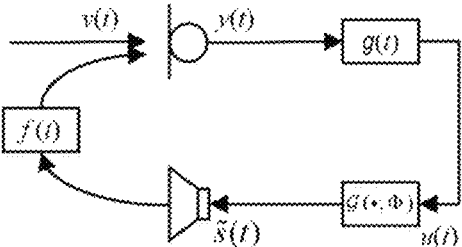
FIG. 5 is a schematic diagram of howling suppression by a deep network module in an embodiment of the present invention.
Figure 6:
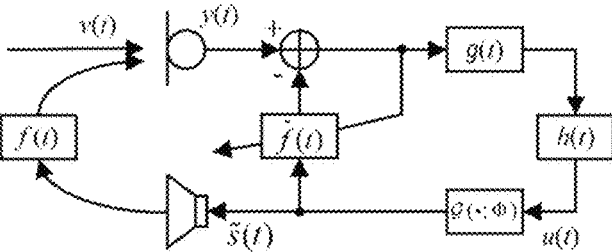
FIG. 6 is a schematic diagram of howling suppression by using a deep network module after the closed-loop system is added with an adaptive feedback cancellation module and a post-processing module.

Step 6: The trained neural network is added to the closed-loop system to suppress acoustic feedback, as shown in FIGS. 5 and 6. The neural network outputs a compressed complex spectrum $\tilde{S}^c(k,l)$ of an estimated signal, and it needs to be decompressed to recover a complex spectrum:

$$\tilde{S}(k, l) = \left| \tilde{S}^c(k, l) \right|^{1/\beta_c} \exp\left( j Ð\left( \tilde{S}^c(k, l) \right) \right) \tag{17}$$

Inverse Fourier transform is performed on the complex spectrum and an overlap-add method is applied thereto to obtain a time-domain form $\tilde{s}(t)$ of the estimated signal.

The present invention relates to acoustic feedback suppression in a closed-loop system such as a hearing aid system and a live sound reinforcement system, generates dedicated training datasets and designs a deep neural network architecture to achieve acoustic feedback suppression in a marginally stable state of the closed-loop system. In this method, a large number of unit impulse responses of an acoustic feedback path are generated by simulation to generate closed-loop feedback signals, and a large number of training datasets are generated by using the signals in combination with noise data, and model training is performed therewith. Applying the model to the closed-loop system can effectively suppress the feedback signals, improve the quality and intelligibility of speech, and significantly improve the gain of the sound reinforcement system. The innovation of the method is that first, closed-loop signals are obtained by simulating a feedback path, and a training dataset is built by using parallel training data for deep learning formed by the closed-loop signals and open-loop signals together; then, a deep learning model is trained by using the built training dataset in an offline training mode; and finally, the model is applied to a closed-loop system to achieve acoustic feedback suppression.

Figure 7:
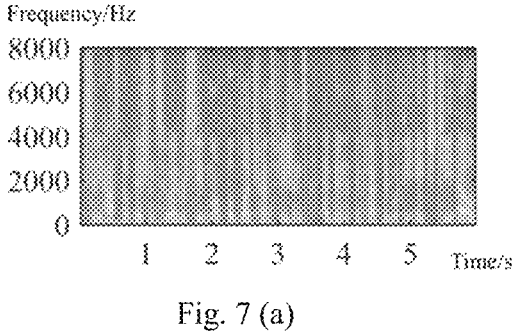
FIG. 7(*b*) is a spectrogram of a time-domain signal u(t) without any feedback suppression.
Figure 7:
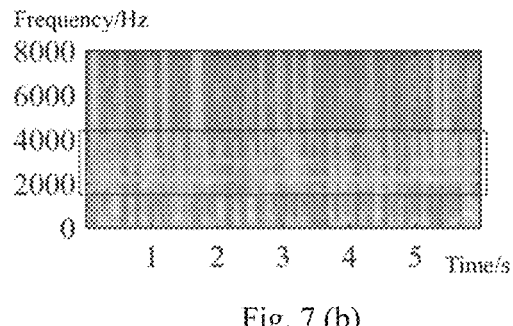
Figure 7:
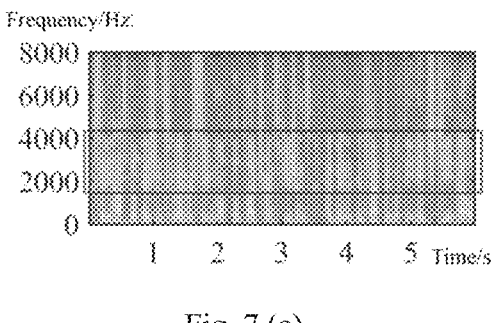
Figure 7:
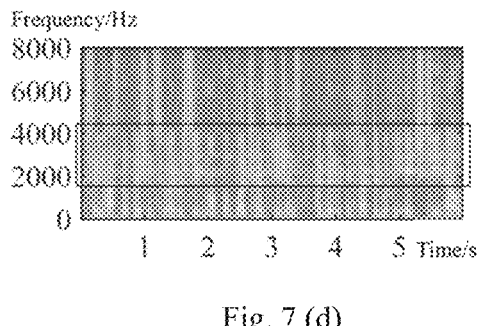
Figure 7:
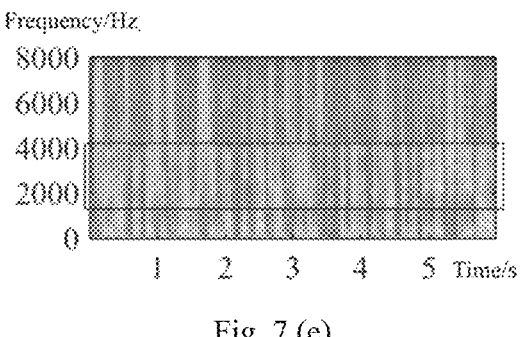
Figure 7:
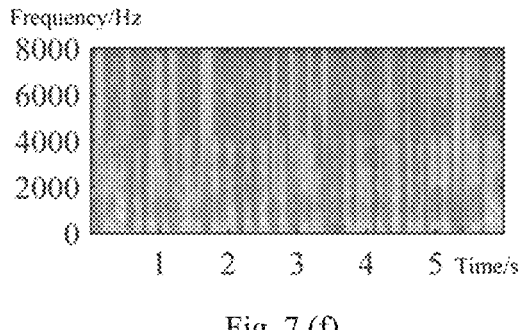

FIG. 7 shows a diagram of the effect of acoustic feedback suppression of the present method and diagrams of the effect of other methods. Specifically, FIG. 7(a) is a spectrogram of a target speech signal; FIG. 7(b) is a spectrogram of a time-domain signal u(t) without any feedback suppression; FIG. 7(c) is a spectrogram of a time-domain signal u(t) after an adaptive feedback cancellation method is applied; FIG. 7(d) is a spectrogram of a time-domain signal u(t) after a frequency shift method is applied; FIG. 7(e) is a spectrogram of a time-domain signal u(t) after a deep denoising method is applied; and FIG. 7(f) is a spectrogram of a time-domain signal u(t) after the method proposed in the present patent is applied.

From the above specific description of the present invention, it is apparent that after applying the trained closed-loop system acoustic feedback suppression model to the closed-loop system, the present invention can effectively suppress the feedback signals, improve the quality and intelligibility of speech, and significantly improve the gain of the sound reinforcement system.

Finally, it should be noted that the above embodiments are only used for describing instead of limiting the technical solutions of the present invention. Although the present invention is described in detail with reference to the embodiments, persons of ordinary skill in the art should understand that modifications or equivalent substitutions of the technical solutions of the present invention should be encompassed within the scope of the claims of the present invention so long as they do not depart from the spirit and scope of the technical solutions of the present invention.

The invention claimed is:

1. A deep learning-based method for acoustic feedback suppression in a closed-loop system, the method comprising:

applying an offline trained closed-loop system suppression model to the closed-loop system, processing an audio signal input to the closed-loop system, and then feeding the processed audio signal to a sound reproduction unit of the closed-loop system for playback to achieve acoustic feedback suppression, the closed-loop system suppression model being built based on deep learning; and modeling the closed-loop system, generating a unit impulse response of an acoustic feedback path by simulation, and calculating a maximum stable gain according to the unit impulse response, and generating a closed-loop signal based on the maximum stable gain; generating an open-loop target signal under an open-loop condition by using the audio signal input to the closed-loop system; forming parallel training data of the model by putting the closed-loop signal and the open-loop target signal together, and training the model by using the generated parallel training data, wherein the model is trained in an offline training mode in the method, comprising the following steps in the training:

step 1: modeling the closed-loop system of acoustic feedback, and generating a unit impulse response of an acoustic feedback path by simulation according to an application scenario;

step 2: establishing a training open-loop system based on deep learning; calculating a maximum stable gain according to the unit impulse response of the acoustic feedback path, determining a forward gain of the open-loop system based on the maximum stable gain, inputting an audio signal and generating an open-loop signal as target audio for training, and in the closed-loop system, inputting a noisy audio signal and generating a noisy closed-loop signal with feedback, the closed-loop signal and the open-loop signal together constituting parallel training data of the model;

step 3: performing feature extraction of the training data and target mapping of a deep learning neural network;

step 4: designing a deep learning neural network architecture and hyper-parameters; and step 5: selecting an appropriate loss function to train the model to obtain a trained closed-loop system suppression model, wherein generating a unit impulse response of an acoustic feedback path by simulation is expressed as:

$$f(t) = \sin(2\pi f_{env} t + \varphi_{env}) r(t) \exp(-\sigma P(t - t_f))$$

$$P(t - t_f) = \begin{cases} 0, & t < t_f \\ t - t_f, & t \geq t_f \end{cases}$$

where $f_{env}$ is a modulation frequency, $\varphi_{env}$ is a random phase, r(t) is a zero-mean Gaussian process, $\sigma$ is a decay function, where $\sigma \geq 0$, and $t_f$ represents the time when exponential decay of the transfer function starts; in the closed-loop system, a forward path amplification module is expressed as:

$$g(t) = G\delta(t - \tau f_s)$$

where $\delta(\cdot)$ represents the Dirac function, and G is in the range of $G \in [0.5G_{max}, 0.999G_{max}]$; and a signal u(t) not subject to feedback suppression processing fed to a speaker and a microphone pickup signal y(t) are obtained from f(t), g(t) and v(t), where v(t) is an external audio signal.

2. The deep learning-based method for acoustic feedback suppression in a closed-loop system according to claim 1, wherein the closed-loop system comprises a forward path amplification module and a delay module; and the modeling of the closed-loop system of acoustic feedback is expressed as:

$$y(t) = v(t) + u(t) * f(t)$$

where t is sampling time, * is convolution operation, v (t) is the external audio signal, u(t)=y(t)*g(t), u(t), with the forward path g(t) being a time-domain signal fed to a speaker, y(t) being a pickup signal of the closed-loop system, and f(t) is the unit impulse response of the acoustic feedback path.

3. The deep learning-based method for acoustic feedback suppression in a closed-loop system according to claim 2, wherein generating a unit impulse response of an acoustic feedback path by simulation comprises:

the delay module performing Fourier transform on signals in the closed-loop system, which is expressed as:

$$Y(\omega) = V(\omega) + U(\omega)F(\omega)$$

$$U(\omega) = Y(\omega)G(\omega)$$

where $\omega$ is an angular frequency, $Y(\omega)$ is Fourier transform of y(t), $F(\omega)$ is Fourier transform of f(t), $V(\omega)$ is Fourier transform of v(t), $U(\omega)$ is Fourier transform of u(t), $G(\omega)$ is Fourier transform of g(t), and frequency-related gains in the forward path are unified in the feedback path $F(\omega)$.

4. The deep learning-based method for acoustic feedback suppression in a closed-loop system according to claim 3, wherein $G(\omega)$ is set to a constant G, and if G is related to the angular frequency, a transfer function in the closed-loop system is:

$$\frac{U(\omega)}{V(\omega)} = \frac{G}{1 - GF(\omega)}$$

according to the Nyquist instability criterion, if a loop gain function meets the following conditions:

$$\begin{cases} \angle GF(\omega) = 2n\pi \\ |GF(\omega)| \geq 1 \end{cases}, n = 0, 1, 2 \ldots$$

where $\angle\bullet$ represents taking a phase, $|\bullet|$ represents taking a modulus; that is, at a specific frequency where the angular frequency is $\omega$, if the modulus of the loop gain function is greater than or equal to 1, and a phase angle of the loop gain function is integer n times of $2\pi$, a sound reinforcement system oscillates, resulting in howling, and thus the maximum stable gain $G_{max}$ of the closed-loop system is obtained, which is expressed as:

$$G_{max} = \frac{1}{\max_{\omega \in \Omega}(|F(\omega)|)}$$

$$\Omega = \{\omega \mid \angle(F(\omega)\exp(-j\omega\tau f_s)) = 2n\pi\}$$

where $\Omega$ is a combination of frequencies that satisfy the phase condition of the Nyquist instability criterion, $\tau$ corresponds to delays of all signal processing systems in the sound reinforcement system, $f_s$ is a sampling frequency, and j is an imaginary symbol.

5. The deep learning-based method for acoustic feedback suppression in a closed-loop system according to claim 4, wherein if the closed-loop system further comprises an adaptive feedback cancellation module and a post-processing module, the transfer function in the closed-loop system is expressed as:

$$\frac{U(\omega)}{V(\omega)} = \frac{GH(\omega)}{1 - GH(\omega)(F(\omega) - \hat{F}(\omega))}$$

where $\hat{F}(\omega)$ is Fourier transform of $\hat{f}(f)$, with $\hat{f}(t)$ being a unit impulse response of the feedback path identified by an adaptive method; and $H(\omega)$ is Fourier transform of h(t), with h(t) being a unit impulse response of the post-processing module;

the closed-loop system with adaptive feedback cancellation and post-processing becomes unstable if a loop gain function satisfies the following conditions:

$$\begin{cases} \angle GH(\omega)(F(\omega) - \hat{F}(\omega)) = 2n\pi \\ |GH(\omega)(F(\omega) - \hat{F}(\omega))| \geq 1 \end{cases}, n = 0, 1, 2 \ldots;$$

and in this case, the maximum stable gain of the closed-loop system is expressed as:

$$G_{max} = \frac{1}{\max_{\omega \in \Omega}(|H(\omega)(F(\omega) - \hat{F}(\omega))|)}$$

$$\Omega = \{\omega \mid \angle((H(\omega)(F(\omega) - \hat{F}(\omega)))\exp(-j\omega\tau f_s)) = 2n\pi\}.$$

6. The deep learning-based method for acoustic feedback suppression in a closed-loop system according to claim 1, wherein mapping target of the deep learning neural network comprises:

mixing the external audio signal v(t) and a noise signal n(t) according to a certain signal-to-noise ratio to obtain a mixed noisy audio input signal z(t):

$$z(t) = v(t) + \alpha n(t)$$

where $\alpha$ is the amount of injected noise calculated according to the signal-to-noise ratio;

using z(t) as an input to the closed-loop system to obtain a noisy signal u(t) with feedback; and using u(t) as an input signal to the neural network, and mapping a target signal s(t), which is expressed as:

$$s(t) = Gv(t - \tau f_s)$$

performing K-point short-time Fourier transforms on u(t) and s(t), respectively, to obtain complex spectra U(k,l) and S(k,l) thereof at a time frame l and a frequency band k, the complex spectra being expressed as:

$$S(k, l) = \sum_{\mu=0}^{K-1} s(lR + \mu)w(\mu)e^{-j2\pi k\mu/K},$$

$$U(k, l) = \sum_{\mu=0}^{K-1} u(lR + \mu)w(\mu)e^{-j2\pi k\mu/K}$$

where w(t) is a window function, K is a frame shift, and $\mu$ is a sum variable;

expressing S(k,l) and U(k,l) as the form of a real part and an imaginary part:

$$S(k, l) = S_r(k, l) + iS_i(k, l)$$

$$U(k, l) = U_r(k, l) + iU_i(k, l)$$

where $S_r(k,l)$ and $S_i(k,l)$ are the real part and the imaginary part of S(k,l), respectively, and $U_r(k,l)$ and $U_i(k,l)$ are the real part and the imaginary part of U(k,l), respectively;

using a complex spectral mapping learning method, training the neural network to learn mapping from $\{U_e(k, l), U_i(k,l)\}$ to $\{S_r(k,l), S_i(k,l)\}$, which process is expressed as:

$$\{\hat{S}_r^c, \hat{S}_i^c\} = G(U_r^c, U_i^c; \Phi)$$

-continued $$S^c = |S|^{\beta_c} \exp(jL(S))$$

where G ($\equiv,\equiv;\ \Phi$) is a mapping function of the deep
learning neural network, with $\Phi$ being a network
parameter, $(\bullet)^c$ represents a compression operation
function, S is an independent variable for the compres-
sion operation function, $\beta_c \in [0,1]$, and $\beta_c$ is a compres-
sion coefficient;
and r and 15 are real and imaginary parts of a compressed
complex spectrum and $$\tilde{S}_r^c$$

and $$\tilde{S}_i^c$$

are real and imaginary parts of a compressed complex
spectrum $\tilde{S}^c(k,l)$ of an estimated signal, respectively,
and $$U_r^c \text{ and } U_i^c$$

are real and imaginary parts of a compressed complex
spectrum of an input signal, respectively.

7. The deep learning-based method for acoustic feedback
suppression in a closed-loop system according to claim 6,
wherein a mean squared error between an estimated result and a training target is directly used as the loss function, and
the complex spectra and magnitude spectra are limited on
the loss function; and a magnitude spectrum and complex spectrum mixed loss
function $L^{Mag+RI}$, a magnitude spectrum loss function
$L^{Mag}$ and a complex spectrum loss function $L^{RI}$ are
respectively expressed as:

$$L^{Mag+RI} = \lambda L^{RI} + (1 - \lambda)L^{Mag},$$

$$L^{Mag} = \left\| |\tilde{S}^c| - |S^c| \right\|_F^2,$$

$$L^{RI} = \left\| \tilde{S}_r^c - S_r^c \right\|_F^2 + \left\| \tilde{S}_r^c - S_i^c \right\|_F^2$$

where $\lambda$ is a weight coefficient with a value between 0 and
1, and $\|\square\|_F$ represents a Frobenius norm, abbreviated
as F-norm.

8. The deep learning-based method for acoustic feedback
suppression in a closed-loop system according to claim 1,
wherein when the trained model is applied to the closed-loop
system, the model outputs a compressed complex spectrum
$\tilde{S}^c(k,l)$ of an estimated target signal, and $\tilde{S}^c(k,l)$ is decom-
pressed to recover a complex spectrum $\tilde{S}(k,l)$, which is
expressed as:

$$\tilde{S}(k,\ l) = \left| \tilde{S}^c(k,\ l) \right|^{1/\beta_c} \exp\left(j\Theta\left(\tilde{S}^c(k,\ l)\right)\right)$$

where $\beta_c$ is a compression coefficient; j is an imaginary
symbol, and $\angle\bullet$ represents taking a phase; and
inverse Fourier transform is performed on the complex
spectrum and an overlap-add method is then applied to
obtain a time-domain form $\tilde{s}(t)$ s of the estimated
signal.

\* \* \* \* \*